US012504338B2

(12) United States Patent
Sun et al.

(10) Patent No.: US 12,504,338 B2
(45) Date of Patent: Dec. 23, 2025

(54) METHOD FOR FASTENING AN ASSEMBLY COMPRISING A STRAIN GAUGE

(71) Applicant: L'Air Liquide, Société Anonyme pour l'Etude et l'Exploitation des Procédés Georges Claude, Paris (FR)

(72) Inventors: Fangyan Sun, Versailles (FR); Olivier Ondo, Palaiseau (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 299 days.

(21) Appl. No.: 18/281,101

(22) PCT Filed: Feb. 4, 2022

(86) PCT No.: PCT/EP2022/052682
§ 371 (c)(1),
(2) Date: Sep. 8, 2023

(87) PCT Pub. No.: WO2022/189076
PCT Pub. Date: Sep. 15, 2022

(65) Prior Publication Data
US 2024/0151597 A1 May 9, 2024

(30) Foreign Application Priority Data
Mar. 9, 2021 (FR) ........................ 2102251

(51) Int. Cl.
G01L 1/22 (2006.01)
F17C 13/02 (2006.01)
(Continued)

(52) U.S. Cl.
CPC ............ *G01L 1/2206* (2013.01); *F17C 13/02* (2013.01); *G01L 9/04* (2013.01); *G01M 5/0041* (2013.01);
(Continued)

(58) Field of Classification Search
CPC ....... G01L 1/22; G01L 1/2206; G01L 1/2287; G01L 1/2293; G01L 9/04; G01M 5/0041; G01M 5/0083; F17C 13/02
See application file for complete search history.

(56) References Cited

U.S. PATENT DOCUMENTS 3,445,800 A   5/1969 Ambulos et al.
3,527,099 A * 9/1970 Herceg ................. G01L 9/0002
                                                        73/726
(Continued)

FOREIGN PATENT DOCUMENTS

AU    2018267576    6/2019
CA    3 024 810     5/2019
(Continued)

OTHER PUBLICATIONS

International Search Report for corresponding PCT/EP2022/052682, May 20, 2022.

Primary Examiner — Paul M. West
(74) Attorney, Agent, or Firm — Elwood L. Haynes

(57) ABSTRACT

A method for fixing an assembly onto a gas vessel configured to contain a pressurized fluid. The assembly including a housing, an electronic acquisition board secured to the housing, and a strain gauge. The method including fixing the strain gauge to the vessel using a second adhesive means, the strain gauge being fixed to the vessel in such a way to allow deformation along with the vessel under the effect of the pressurized gas contained in the vessel. Electrically connecting the strain gauge and the electronic acquisition board using at least one electric cable thereby allowing the housing to be free to move relative to the strain gauge. Fixing the housing to the vessel using a first adhesive means so as to cover the strain gauge and thereby leaving a volume of air (Continued)

between the housing and the strain gauge and/or between the strain gauge and the electronic acquisition board.

8 Claims, 1 Drawing Sheet

(51) Int. Cl.
*G01L 9/04* (2006.01)
*G01M 5/00* (2006.01)

(52) U.S. Cl.
CPC ... *G01M 5/0083* (2013.01); *F17C 2250/0469* (2013.01); *F17C 2270/0745* (2013.01)

(56) References Cited

U.S. PATENT DOCUMENTS

| | | | |
|---|---|---|---|
| 8,490,481 B2 * | 7/2013 | Arms | G01N 27/223 |
| | | | 73/431 |
| 2013/0139897 A1 | 6/2013 | Kim et al. | |
| 2020/0182715 A1 * | 6/2020 | Fyfe | G01L 1/242 |
| 2021/0318191 A1 * | 10/2021 | Okulov | G06F 1/1656 |

FOREIGN PATENT DOCUMENTS

| | | | |
|---|---|---|---|
| EP | 3486548 A1 * | 5/2019 | ............ F17C 13/025 |
| FR | 3 016 424 | 7/2015 | |
| FR | 3 092 897 | 8/2020 | |
| WO | WO 02 066366 | 8/2002 | |
| WO | WO 2018 219683 | 12/2018 | |
| WO | WO 2020 193890 | 10/2020 | |

\* cited by examiner

[Fig. 1]
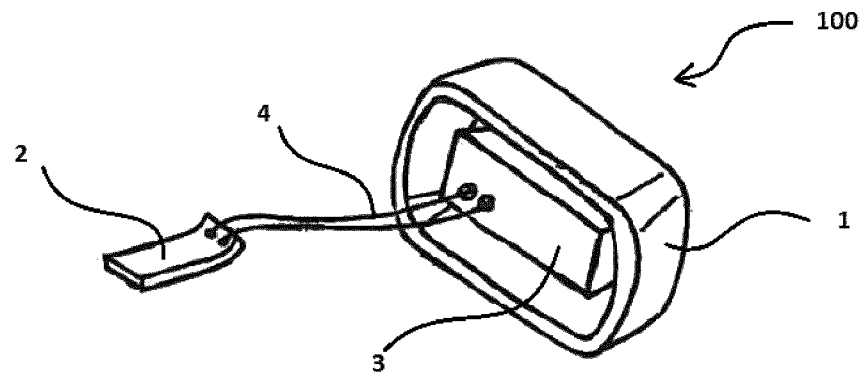
[Fig. 2]
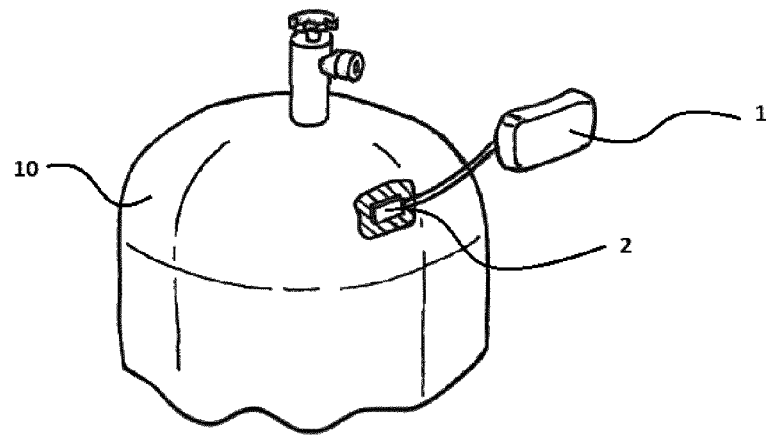
[Fig. 3]
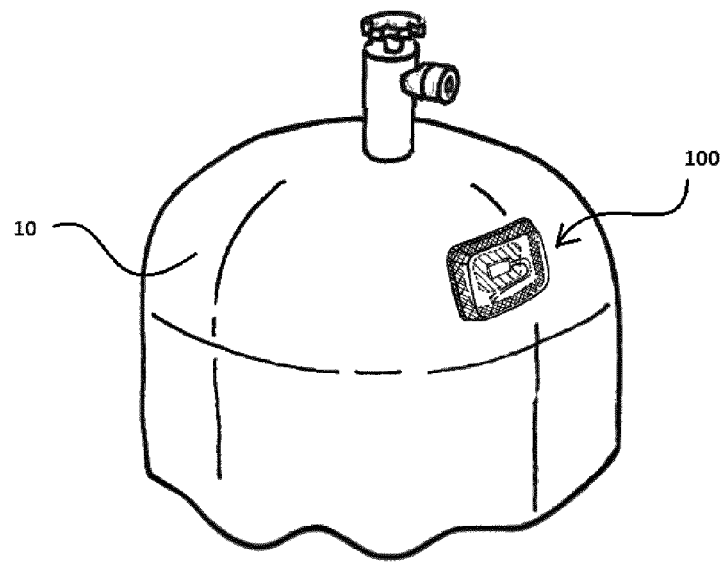

METHOD FOR FASTENING AN ASSEMBLY COMPRISING A STRAIN GAUGE

CROSS REFERENCE TO RELATED APPLICATIONS

This application is a 371 of International Application No. PCT/EP2022/052682, filed Feb. 4, 2022, which claims priority to French Patent Application No. 2102251, filed Mar. 9, 2021, the entire contents of which are incorporated herein by reference.

BACKGROUND

The present invention relates to a method for fixing an assembly onto a vessel intended to contain a pressurized fluid, the assembly comprising a housing, an electronic acquisition board and a strain gauge, and to a device comprising such a vessel and such an assembly.

A strain gauge is a sensitive element of which the resistance varies when it is deformed. When the gauge is perfectly bonded to a vessel, such as a gas vessel, of which it is desired to determine the deformation under the effect of a pressurized fluid contained in the vessel (such a pressurized fluid is at a pressure higher than atmospheric pressure), it deforms in the same way as the body of the vessel and it is therefore possible to determine the deformation of the body of the vessel on the basis of the deformation of the strain gauge.

Documents FR 3 016 424, US 2013/139897 and WO 02/066366 describe strain gauges arranged on gas vessels, for example a vehicle gas tank or gas cylinder.

However, bonding a strain gauge is still considered nowadays to be a delicate procedure because the quality of the bonding will have a direct influence on the quality of the deformation measurement. It then follows that the bonding of a strain gauge needs to meet certain requirements notably as regards the choice of the adhesive and the procedure used for bonding the gauge, particularly when the gauge is to be bonded directly onto the vessel, for example a gas vessel.

Thus, in the case of a gas vessel, such as a gas cylinder or tank, the strain gauge needs to be bonded directly to the body of the vessel so that the deformation of the body of the vessel can be measured correctly.

Moreover, it is not only the strain gauge that is to be fixed, but rather the assembly comprising the housing, the strain gauge and other components such as a battery, and an electronic board for the acquisition, processing and possible transmission of the measured data.

The problem that therefore arises is that of being able to bond a strain gauge and fix the housing on a vessel, particularly a gas vessel, and of doing so quickly, simply and effectively, although without nevertheless having a negative impact on the deformation measurement performed by the gauge, and also durably (>10 years).

Document FR 3 092 897 discloses a method for bonding an assembly comprising a housing and a strain gauge which are secured to one another, the bonding then being performed in a single action (the housing and the gauge are bonded to the cylinder at the same time). There is a problem with such a method because correct bonding of the strain gauge is not guaranteed.

SUMMARY

The present invention seeks to effectively overcome this disadvantage by proposing a method for fixing an assembly onto a gas vessel intended to contain a pressurized fluid, particularly a gas cylinder or a vehicle gas tank, the assembly comprising a housing, an electronic acquisition board secured to the housing and a strain gauge, the method comprising the steps of:

fixing the strain gauge to the vessel using a second adhesive means such as an adhesive, the strain gauge being fixed to the vessel in such a way that it deforms with the vessel under the effect of the pressurized gas contained in the vessel, electrically connecting the strain gauge and the electronic acquisition board using at least one electric cable such that the housing remains free to move relative to the strain gauge, fixing the housing to the vessel using a first adhesive means so as to cover the strain gauge and so as to leave a volume of air between the housing and the strain gauge and/or between the strain gauge and the electronic acquisition board.

Such a method allows the strain gauge to be fixed correctly, without the housing being able to interfere with said gauge either during or after said fixing and while this gauge is in use for measuring the deformation of the vessel under the effect of the pressurized gas contained in the vessel. This type of configuration also allows greater freedom between the housing (or the electronic acquisition board) and the strain gauge to allow the strain gauge to be fixed correctly.

According to one embodiment, the gas vessel is a gas cylinder or a vehicle gas tank or a portion of a pressurized-gas distribution network.

According to one embodiment, the step of electrically connecting the strain gauge and the electronic acquisition board is performed before the step of fixing the strain gauge to the vessel.

As a variant, the step of electrically connecting the strain gauge and the electronic acquisition board is performed after the step of fixing the strain gauge to the vessel.

According to one embodiment, the step of fixing the housing to the vessel is performed after the step of electrically connecting the strain gauge and the electronic acquisition board.

According to one embodiment, the step of fixing the housing to the vessel is performed after the step of fixing the strain gauge to the vessel.

According to one embodiment, the length of the electric cable is dimensioned to allow the housing to remain free to move relative to the strain gauge before the housing is fixed to the vessel.

According to one embodiment, the step of fixing the housing is performed in such a way that the housing and/or the electronic board applies no force to the strain gauge.

Such an arrangement means that the strain gauge can be deformed only by the deformation of the vessel and not by pressure coming directly or indirectly from the housing.

According to one embodiment, the second adhesive means comprises an adhesive of methacrylate, epoxy or cyanoacrylate type, or mixtures thereof.

According to one embodiment, the first adhesive means and the second adhesive means have distinct natures and/or compositions.

According to one embodiment, the first adhesive means comprises an adhesive of methacrylate, epoxy or cyanoacrylate type, or mixtures thereof.

As a variant, the first adhesive means comprises an adhesive support comprising two opposite surfaces to which one or more adhesives are applied, the adhesive support preferably comprising a double-sided adhesive tape.

According to one embodiment, the first adhesive means is positioned on an underside face of the housing, the underside face being designed to conform to the external surface of the vessel when the housing is fixed to the vessel.

According to one embodiment, the second adhesive means is applied directly to the strain gauge.

According to one embodiment, the step of fixing the housing is performed in such a way as to leave a free space between the strain gauge and the housing and/or between the strain gauge and the electronic acquisition board so that neither the electronic acquisition board nor the housing applies any force to the strain gauge.

According to one embodiment, the free space forms an internal space notably intended to receive a gas such as air.

According to one embodiment, the internal space is devoid of liquid or solid.

According to one embodiment, the electric cable is soldered or connected by a connector to the strain gauge and to the electronic acquisition board.

According to one embodiment, the cable comprises a connector.

According to one embodiment, the adhesive support of the first adhesive means comprises two opposite surfaces bearing one or more instant-grab adhesives (i.e. that bond in under 30 seconds at ambient temperature), for example of the acrylate (pressure-sensitive adhesive) type.

According to one embodiment, the adhesive support of the first adhesive means is formed of a material of synthetic foam or similar type.

According to one embodiment, the adhesive support of the first adhesive means may for example be the 3M™ double-sided tape, reference VHB™ 4941.

According to one embodiment, the second adhesive means comprises an adhesive of methacrylate, epoxy or cyanoacrylate type.

According to one embodiment, the first adhesive means may be moisture resistant so as to create a seal around the strain gauge.

According to one embodiment, the housing is rigid.

According to one embodiment, the housing is made of polymer, for example polyurethane or similar.

As a variant, the housing is made of ceramic.

According to one embodiment, the housing has no means of electrical connection to the strain gauge.

According to one embodiment, the housing contains electrical power supply means, preferably one or more batteries.

According to one embodiment, the electronic acquisition board comprises data processing means used to process the data handled by the strain gauge.

According to one embodiment, the data processing means comprise an electronic board with microprocessor(s).

According to one embodiment, the microprocessor is preferably a microcontroller.

According to one embodiment, the microprocessor implements one or more algorithms.

According to one embodiment, the electronic acquisition board comprises data transmission means allowing data, typically measurements, to be transmitted over a distance, advantageously wirelessly, for example to a remote server or any other device.

According to one embodiment, the data processing means collaborate with the data transmission means so as to supply same with data or similar.

According to one embodiment, the data transmission means comprise an emitting and/or receiving antenna.

According to one embodiment, the data transmission means comprise one or more modems or similar.

According to one embodiment, the data transmission means operate according to a communications protocol of GMS, Bluetooth (BLE), or Wi-Fi type, or over LPWA (Lora, Sigfox) networks or using any other communications protocol suitable for connected objects.

According to one embodiment, the vessel is a vessel for fluid, preferably gas, particularly a gas cylinder, which is to say one containing a gas in whatever form(s) that might be (i.e. gaseous and/or liquid, etc. form).

According to one embodiment, the fluid vessel comprises a hollow body, particularly of cylindrical shape, defining an internal volume for the fluid.

According to one embodiment, the housing and the gauge are bonded to the body of the vessel.

According to one embodiment, the vessel comprises a hollow body comprising a neck forming a restriction at which an outlet orifice for the fluid is formed.

According to one embodiment, the housing and the gauge are bonded to the neck of the vessel.

According to one embodiment, the vessel is a gas cylinder equipped with a gas distribution valve or tap, with or without inbuilt regulator, preferably protected by a rigid bonnet, for example made of plastic or of metal, arranged around said valve or tap so as to protect it against impacts.

According to one embodiment, surface-preparation is performed on the surface of the vessel at the site at which the housing and/or the gauge are to be bonded, prior to fixing same.

According to one embodiment, the surface-preparation of the vessel comprises a cleaning, an abrading, a pickling and/or a degreasing, or any other operation aimed at promoting adhesion and eliminating any intermediate layers that could distort the measurement.

The invention also relates to a method for fixing an assembly onto a vessel intended to contain a pressurized fluid, the assembly comprising a housing, an electronic acquisition board and a strain gauge, the electronic acquisition board being secured to the housing, the assembly being designed to be in a first configuration in which the strain gauge and the housing are separated by a distance D1 and in a second configuration in which the strain gauge and the housing are separated by a distance D2 less than D1, the method comprising the steps of:
  fixing the strain gauge to the vessel using a second adhesive means such as an adhesive, the assembly being in the second configuration,
  fixing the housing to the vessel using a first adhesive means, the assembly being in the first configuration.

The features hereinabove can be applied individually or in combination to this invention.

The invention also relates to a method for fixing an assembly onto a vessel intended to contain a pressurized fluid, the assembly comprising a housing and a strain gauge, the method comprising the steps of:
  fixing the strain gauge to the vessel using a second adhesive means such as an adhesive, the housing being free to move relative to the strain gauge,
  fixing the housing to the vessel, using a first adhesive means, so as to cover the strain gauge.

The features hereinabove can be applied individually or in combination to this invention.

The invention finally relates to a device comprising a gas vessel intended to contain a pressurized fluid, particularly a gas cylinder or a vehicle gas tank, and an assembly, the assembly comprising a housing, an electronic acquisition board secured to the housing and a strain gauge, the housing being bonded directly to the external surface of the vessel by way of a first adhesive means, the strain gauge being bonded directly to the external surface of the vessel by means of a second adhesive means comprising an adhesive of methacrylate, epoxy or cyanoacrylate type, or mixtures thereof, the strain gauge being fixed to the vessel in such a way that it deforms with the vessel under the effect of the pressurized gas contained in the vessel, the electronic acquisition board being fixed to the housing, the strain gauge being electrically connected to the electronic acquisition board by at least one electric cable, the electric cable having a length greater than the distance between the electronic board and the strain gauge, the distance being the distance that exists when the housing is bonded to the vessel, a free space being formed between the strain gauge and the housing and/or between the strain gauge and the electronic acquisition board so that neither the electronic acquisition board nor the housing applies force to the strain gauge.

According to one embodiment, the length of the electric cable is greater than 3 times the distance between the electronic board and the strain gauge, the distance being the distance that exists when the housing is bonded to the vessel.

The features hereinabove can be applied individually or in combination to this invention.

BRIEF DESCRIPTION OF THE DRAWINGS

The invention will be understood better from reading the following description and from studying the accompanying figures. These figures are given only by way of illustration and do not in any way limit the invention.

FIG. 1 is a schematic depiction of an assembly according to the invention before it is fixed to a vessel;

FIG. 2 is a schematic depiction of a vessel to which the strain gauge of the assembly of FIG. 1 has been fixed;

FIG. 3 is a depiction of the vessel of FIG. 2, to which the assembly is fixed.

DETAILED DESCRIPTION OF PREFERRED EMBODIMENTS

Reference is made to FIG. 1 which depicts an assembly 100 comprising a housing 1, an electronic acquisition board 3 and a strain gauge 2. The strain gauge 2 is connected to the electronic acquisition board 3 by way of an electric cable 4.

Reference is made to FIG. 2 which depicts one step of a method for fixing the assembly 100 to a vessel 10 intended to contain a pressurized fluid. During this step, the strain gauge 2 has been fixed to the wall of the vessel 10 using a second adhesive means such as an adhesive, the housing 1 being free to move relative to the strain gauge 2.

In the example of FIG. 2, the housing 1 is free relative to the strain gauge 2 because it is connected to the latter by the electric cable 4, allowing it a degree of movement relative to the strain gauge 2.

Thus, during the step of fixing the strain gauge 2, the housing 1 has no impact on the quality of the fixing of this gauge.

Reference is made to FIG. 3 which depicts the vessel 10 once the step of fixing the housing 1 to the vessel 10 using a first adhesive means, so as to cover the strain gauge 2, has been performed.

In the example of FIG. 3, the electric cable 4 is also covered by the housing 1. After the assembly 100 has been fixed to the vessel 10, the housing 1 thus applies no force to the strain gauge 2, thereby guaranteeing that the strain gauge 2 will operate correctly and precisely. Once the housing 1 has been fixed to the vessel 10, the strain gauge 2 is surrounded by air which is trapped in an internal space between the housing and the vessel 10. If the housing 1 is not fixed in an entirely fluidtight manner, the internal space may find itself in fluidic communication with the environment in which the vessel lies.

The internal space may be at least partially filled with a gas other than ambient air and the housing 1 may be fixed in a fluidtight manner relative to the vessel 10.

In the example depicted, the vessel 10 is a gas cylinder. Thus, determining the deformation of the wall of the gas cylinder 10 makes it possible thereafter, once the measured deformation values have been processed, to determine the fill level of the cylinder, which is to say the quantity of gas that it contains.

To do that, the strain gauge 2 needs to be subjected to a deformation field that is identical to that applied by the gas pressure to the external wall of the gas cylinder 10. The gauge 2 therefore needs to be secured to the external wall of the gas cylinder 10.

The strain gauge 2 is moreover electrically connected to the electronic acquisition board 3.

The electronic acquisition board 3, such as an electronic board with microprocessor(s), is mounted secured to the housing 1.

It comprises data processing means allowing the deformation measurements taken by the strain gauge 2 to be processed. It further comprises data transmission means for transmitting data over a distance.

The housing 1 acts as a protective casing. It contains one (or more) electrical battery (batteries).

The battery supplies electrical current to the strain gauge 2, to the data processing means, to the data transmission means, and potentially to other components which need current in order to operate.

By way of example, the second adhesive means is applied directly between the strain gauge 2 and the cylinder 10. It preferably has:

a glass transition temperature Tg that is as high as possible (>80° C.) so as not to affect the measurement by the gauge 2 of the deformation of the cylinder 10, an elongation of between 2 and 7%, which is to say that is close to the deformation values that are to be measured, crosslinking at ambient temperature (typically around 20° C.) so that there is no need to heat the housing 1 during the fixing procedure, a thermal expansion coefficient (close to that of steel) to limit shear stresses on the gauge when there are variations in the ambient temperature, high resistance to thermal ageing and to chemical products, and/or low viscosity so as to ensure uniform bonding in a thin layer.

In order to meet these requirements, adhesives of methacrylate, epoxy and cyanoacrylate type, or mixtures of these adhesives, may be suitable as second adhesive means.

Moreover, regarding the first adhesive means used to fix the housing 1, which comprises a flattened adhesive support such as a tape or a strip, the two opposite surfaces of which are covered with one or more adhesives, advantageously a double-sided adhesive tape, this may bear one (or more than one) same adhesive on both opposite surfaces or, as the case may be, different adhesives.

This or these adhesives may also be of methacrylate, epoxy and cyanoacrylate type, or mixtures thereof. However, it must be emphasised that the adhesive(s) are in this case chosen to allow rapid grab (i.e. bonding), which is to say (near-) instant grab at the moment of placement of the housing 1 against the surface of the cylinder 10, and preferably to provide a fluidtight seal thereby protecting the strain gauge 2.

Advantageously, what is chosen by way of first adhesive means is a flattened adhesive support having a thickness of the order of 0.1 to 2 mm, preferably formed from a slightly deformable material (the deformability of the support allowing better conformity to non-planar surfaces), of the synthetic foam (for example acrylic, PE, PET, etc. foam) type, typically a double-sided adhesive tape or similar.

The first adhesive means may meet at least one of the following requirements:
 a grab (i.e. bonding) time that is as short as possible (i.e. <1 minute, or even <10 sec) so that it immediately holds the assembly in place on the cylinder,
 fluidtightness so as to protect the strain gauge 2 against moisture,
 good resistance to vibration and impact,
 good resistance to temperatures fluctuating between −40° C. and 50° C., and/or
 good durability over time (i.e. >5 years).

By way of example, the support may comprise a synthetic foam that does have a little thickness, which is to say that is at least 0.8 mm thick, so as to adapt to a variety of radii of curvature of the cylinders 10.

Advantageously, in order to obtain effective fixing of the assembly 100, notably of the strain gauge 2, at least one of the following steps may be performed:
 abrading that region of the cylinder 10 at which the assembly 100 is to be fixed,
 degreasing/cleaning of that region of the cylinder 10 after abrading, As a variant, the first adhesive means is identical to the second adhesive means, namely for example is an adhesive, notably an adhesive of methacrylate, epoxy or cyanoacrylate type, or mixtures thereof.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for fixing an assembly onto a gas vessel configured to contain a pressurized fluid, the assembly comprising a housing, an electronic acquisition board secured to the housing, and a strain gauge, the method comprising:
 fixing the strain gauge to the vessel using a second adhesive means, the strain gauge being fixed to the vessel in such a way to allow deformation along with the vessel under the effect of the pressurized gas contained in the vessel,
 electrically connecting the strain gauge and the electronic acquisition board using at least one electric cable thereby allowing the housing to be free to move relative to the strain gauge,
 fixing the housing to the vessel using a first adhesive means so as to cover the strain gauge and thereby leaving a volume of air between the housing and the strain gauge and/or between the strain gauge and the electronic acquisition board.

2. The method as claimed in claim 1, wherein the housing is fixed such that the housing and/or the electronic board applies no force to the strain gauge.

3. The method as claimed in claim 2, the second adhesive means comprising an adhesive of methacrylate, epoxy or cyanoacrylate type, or mixtures thereof.

4. The method as claimed in claim 1, the first adhesive means comprising an adhesive support comprising two opposite surfaces to which one or more adhesives are applied.

5. The method as claimed in claim 1, the first adhesive means being positioned on an underside face of the housing, the underside face being designed to conform to the external surface of the vessel when the housing is fixed to the vessel.

6. The method as claimed in claim 1, the second adhesive means being applied directly to the strain gauge.

7. The method as claimed in claim 1, the electric cable being soldered or connected by a connector to the strain gauge and to the electronic acquisition board.

8. A device comprising a gas vessel configured to contain a pressurized fluid and an assembly, the assembly comprising a housing, an electronic acquisition board secured to the housing and a strain gauge, the housing being bonded directly to the external surface of the vessel by way of a first adhesive means, the strain gauge being bonded directly to the external surface of the vessel by means of a second adhesive means comprising an adhesive of methacrylate, epoxy or cyanoacrylate type, or mixtures thereof, the strain gauge being fixed to the vessel thereby allowing deformation with the vessel under the effect of the pressurized gas contained in the vessel, the electronic acquisition board being fixed to the housing, the strain gauge being electrically connected to the electronic acquisition board by at least one electric cable, the electric cable having a length greater than the distance between the electronic board and the strain gauge, the distance being the distance that exists when the housing is bonded to the vessel, a free space being formed between the strain gauge and the housing and/or between the strain gauge and the electronic acquisition board so that neither the electronic acquisition board nor the housing applies force to the strain gauge.

* * * * *